May 7, 1940. P. R. LEE ET AL 2,199,639

LOAD LIMITING MEANS FOR AN ELECTRICAL SYSTEM

Filed Nov. 12, 1938

WITNESSES:
Edward Michaels
Mw. C. Groome

INVENTORS
PAUL R. LEE &
EARL K. CLARK.
BY
W. R. Coley
ATTORNEY

Patented May 7, 1940

2,199,639

UNITED STATES PATENT OFFICE 2,199,639

LOAD LIMITING MEANS FOR AN ELECTRICAL SYSTEM

Paul R. Lee and Earl K. Clark, Mansfield, Ohio, assignors to Westinghouse Electric & Manufacturing Company, East Pittsburgh, Pa., a corporation of Pennsylvania Application November 12, 1938, Serial No. 240,034

5 Claims. (Cl. 171—97)

Our invention relates to electrical systems and has for an object to provide improved means for limiting the amount of load that is imposed thereon.

A further object of the invention is to provide improved snap-acting thermally actuated switching means for limiting the load which may be imposed on an electrical system.

A further object of the invention is to limit the maximum current demands of domestic loads having electrical translating devices that are subject to call for immediate service and electrical water heating or similar means wherein the translated energy is stored.

These and other objects are effected by our invention as will be apparent from the following description and claims taken in connection with the accompanying drawing forming a part of this application, in which:

Figures 2, 3:
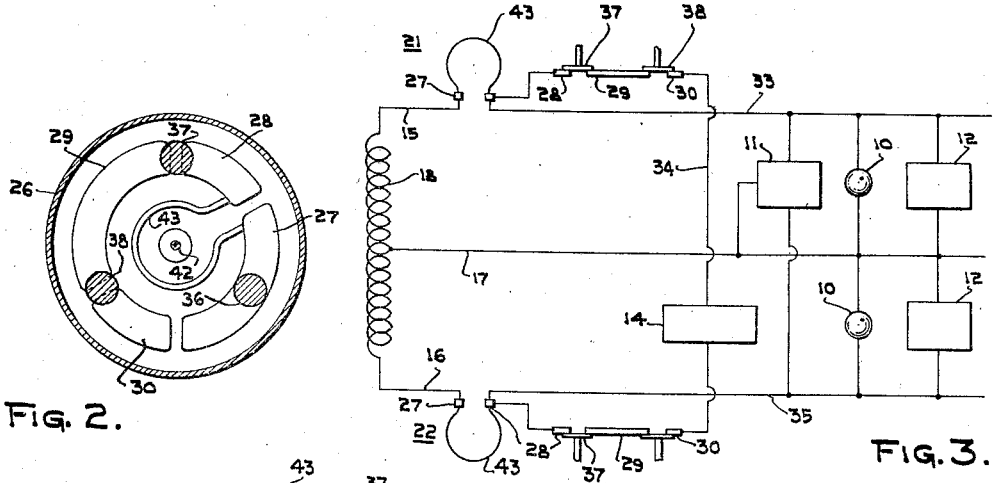
Fig. 2 is a sectional view taken along the line II—II of Fig. 1.
Fig. 3 is a diagram of the connections of an electrical system controlled in accordance with the invention; and, Fig. 4 is a view of a modification of the system shown in Fig. 3.

Reference will now be had to the drawing and particularly to Fig. 3 thereof wherein we have shown a diagram of the electrical connections of a residence having an electrical load which is subject to call for immediate service and comprising, for example, lights 10, a range 11 and other appliances 12, such as, fans or small heating devices. A second load which is not subject to call for immediate service such as, for example, a water heater is shown at 14. This form of load is automatically operated for heating a relatively large quantity of tap water which is intermittently drawn off, so that the translated electrical energy is stored as heat in the body of water.

Electrical energy for the current consuming devices is provided by a three-wire system including two "outside" or main wires 15 and 16 and a neutral wire 17 which are connected to a power source shown as a transformer secondary 18. In this form of supply system the voltage drop across the main wires 15 and 16 is substantially double the drop between each main and the neutral wire 17. For example, if the voltage drop across the conductors 15 and 16 is 230 volts, then the voltage between either of these conductors and neutral is 115 volts. As the water heater and range are high current consuming devices, they are connected across the high voltage conductors 15 and 16 for energization. The lamp 10 and smaller translating devices 12 are relatively low current consuming devices and are energized at lower voltage by an outside wire 15 or 16 and neutral 17.

The water heater represents a large portion of the total electrical load and may be in operation during periods when the range is active. Accordingly, the current demand at this time is very high so that the capacity of the electrical distributing and metering apparatus used by the power company is determined by this peak load. It has been proposed heretofore to provide apparatus for limiting the maximum current demands of residences by disconnecting or reducing the water heating load when the remaining load is high. The apparatus for effecting this operation has been expensive to produce so that its cost has discouraged its use. An object of our invention is to provide a low cost control device for limiting maximum current demands, which device occupies a minimum of space and is reliable in operation.

Figure 1:
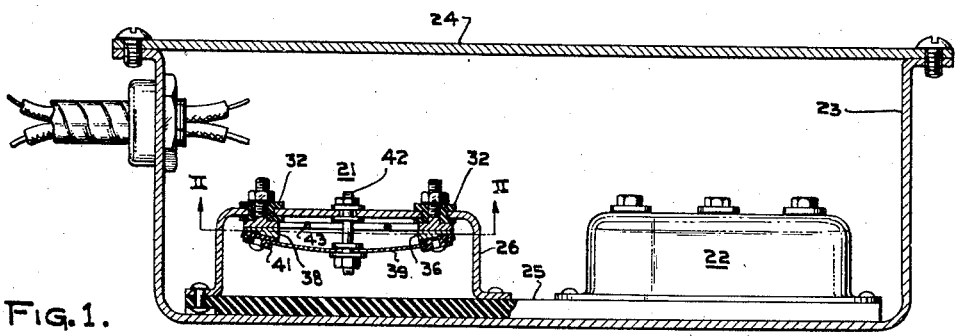
Fig. 1 is a longitudinal view partially in section through a control device constructed in accordance with our invention.

The construction of the load limiting device will be best understood by referring to Figs. 1 and 2 wherein we have shown a pair of thermal relays generally indicated at 21 and 22 disposed in side-by-side relation within a housing 23, the latter preferably being a conventional conduit box provided with a cover 24. The housing or conduit box 23 may be provided with the usual "Knockouts," not shown, for receiving conduit, armored cable, etc. An insulating base 25 is preferably employed for supporting the relays 21 and 22 and for insulating the same from the box 23. As the relays 21 and 22 are duplicates, only the relay 21 will be described in detail.

The relay includes a support 26 preferably formed as an inverted cup and carrying a plurality of stationary contacts 27 to 30, inclusive, which are insulated from the support 26 as shown at 32. As shown in Fig. 3, the contact 27 is connected to the main conductor 15 and the contact 28 is connected to a conductor 33 forming a portion of the circuit serving the range 11, lamps 10 and appliances 12. The contact 30 is connected to a conductor 34 defining the circuit for the water heater 14. The connections of the other relay 22 are similar to those described heretofore, except its contacts 27 and 28 are connected, respectively, to the line conductor 16 and a conductor 35 forming a part of the circuit of the range 11, lamps 10 and appliances 12. The electrical connections of the conductors 15, 16, 33, 34 and 35 with the contacts 27, 28 and 30 have been omitted in Figs. 1 and 2 for the sake of clearness. These connections are, however, clearly shown diagrammatically in Figs. 3 and 4.

The stationary contacts 27 to 30 cooperate with movable contacts 36, 37 and 38 which are carried by a thermal responsive element 39. Preferably, the element 39 defines a disc of bimetal construction and so arranged that when it is heated above a predetermined temperature, it is bowed from the position shown so that the movable contacts 36, 37 and 38 are disengaged from the contacts 27 to 30, inclusive. When the temperature of the disc 39 is below a predetermined value, the disc 39 is positioned as shown with the contacts engaging. All of the movable contacts 36, 37 and 38 are insulated from the disc 39 as shown at 41 (Fig. 1). We prefer to employ three contacts on the disc 39 for providing a three-point support for the disc, although only two contacts, that is, the contacts 37 and 38, are connected in the electrical circuit 34 of the water heater. These contacts 37 and 38 are arranged in series in the water heater circuit for distributing and reducing arcing when actuated to the open position. The third contact 36 is a "dummy" contact that provides the three-point support for the disc in closed position, whereby a more stable support is provided for distributing the pressure on the contacts.

Figure 4:
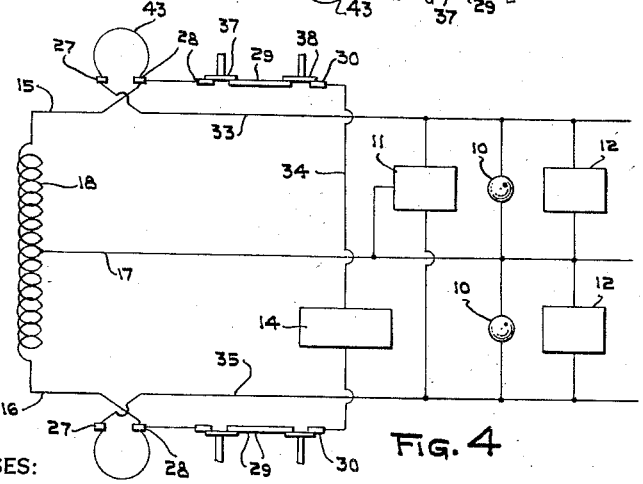

The disc 39 is secured at its center to the support 26 by means of a bolt 42. Heating of the disc 39 is effected by a heater coil 43 that may be connected in series with the total electrical load as shown in Fig. 3 or in series only with the conductors 33 and 35 serving the range, lamp and appliance load as shown in Fig. 4. The difference in these connections will be referred to more in detail hereinafter.

*Operation*

As shown in Fig. 3, the relays 21 and 22 are both in their closed positions as the current demand is below the value at which the disc 39 snaps to "switch open" position. It will be assumed that the water heater is energized and that some lamps 10 are operated. It will be further assumed that each disc 39 operates to open its contacts when the current in its associated heater 43 is 25 amperes or above and closes the contacts when the current drops to 15 amperes or below. If the range is now operated, the current in one or both of the heaters 43 may exceed 25 amperes so that the disc 39 associated therewith snaps to its switch open position, wherein the contacts 37 and 38 disengage the stationary contacts 28 to 30, inclusive, for deenergizing the water heater 14. Accordingly, the current in the heaters 43 is decreased to a value of, say 20 amperes. The disc 39 is calibrated to maintain the contacts disengaged until the current has dropped to 15 amperes.

When the range is deenergized, the current is decreased to a value of 5 amperes, for example, so that the disc snaps to its "switch closed" position and again energizes the water heater 14.

It is well understood that considerable unbalance in the load on each side of the neutral wire may prevail and that it is for this reason that a relay is associated with each main conductor 15—16. Opening of the circuit of the water heater 14 is effected at any time that the current in either of the main conductors 15 or 16 increases above a predetermined value or 25 amperes in the example set forth.

In Fig. 4, a connection diagram is disclosed wherein only the current in the conductors 33 or 35 serving the lights, range, etc., traverses the heaters 43. This circuit arrangement is obtained by connecting the line conductors 15 and 16 to the contacts 28 and the conductors 33 and 35 to the contacts 27; no other changes in the circuit being necessary. In the embodiment shown in Fig. 4, the disc 39 may be arranged to open when the current in the heater attains a value of, for example, 20 amperes and closes when the value of the current decreases to 15 amperes. Assuming the water heater requires 5 amperes, the results are similar to those obtained in the prior embodiment, that is, the water heater 14 is deenergized when the current in either of the main conductors 15 or 16 exceeds 25 amperes and it is energized when the current is reduced to 15 amperes. Either of the control systems disclosed heretofore will satisfactorily limit the amount of load that is imposed on the transformer secondary 18.

From the foregoing, it will be apparent that we have provided an improved thermal responsive control means for limiting the load which may be imposed upon an electrical distributing system. Our improved control mechanism may be economically manufactured and is compact so that it occupies a small amount of space. Furthermore, it can be readily applied to the wiring of residences or the like for limiting the amount of load that is imposed on the power system serving the same.

While we have shown our invention in several forms, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

What we claim is:

1. In combination, a three-wire electrical system having a neutral wire and two main wires, a plurality of translating devices connectable across each of the main wires and the neutral wire, an electrical load connectable across two of the wires of the system, first and second switches connected in series with said electrical load across said two wires, thermal responsive elements associated with the respective switches for opening and closing the same in response to predetermined high and low temperatures of the elements, and first and second electrical heaters for the respective elements, said heaters being associated, respectively, with said two main wires and energized at rates varying with the value of the current in their associated main wires.

2. In combination, a three-wire power source having two main wires and a neutral wire, a plurality of translating devices adapted for connection between each of the main wires and the neutral wire, an electrical load connectable across the two main wires, first and second switches connected in series with said electrical load across said two main wires and first and second thermally responsive means associated with the respective switches and respectively heated in accordance with the current in the main wires for actuating the switches, said switch actuating means effecting opening and closing of their associated switches in response to predetermined high and low values of the current in the main wires associated therewith.

3. In a control device for an electrical system including first and second electrical translating devices, the combination of a support, four contact members carried by the support and insulated therefrom, said contacts being arranged in a circle, a thermal responsive snap-over disc having three contacts carried thereby, one of which engages the first of the stationary contacts, another of which bridges the second and third stationary contacts and the third of which bridges the third and fourth stationary contacts when the disc is heated to a predetermined temperature, a heater for the disc and connected across the first and second stationary contacts, first and second conductors defining a source of power for the translating devices, said first conductor being connected to one of said first and second stationary contacts, said second conductor being connected to one terminal of both of the translating devices, a third conductor connecting the other of said first and second stationary contacts to the other terminal of the first translating device, and a fourth conductor connecting the other terminal of the second translating device with one of said stationary contacts other than said first and second contacts.

4. In combination, a three-wire electrical system having a neutral wire and two main wires, a plurality of sets of preferred translating devices, said sets being respectively individually connectable across the respective main wires and the neutral wire, an electric water heater connectable across two of the wires of the system, first and second switches connected to the respective terminals of said load, thermal responsive elements for respectively effecting the opening or closing of said switches, and electrical heaters for the respective elements connected to be energized in accordance with the total currents traversing the respective sets of said translating devices and said load thereby to cause each thermal responsive element, upon a predetermined increase in the total currents traversing it, to open the associated switch and disconnect said water heater from circuit.

5. In combination, a three-wire electrical system having a neutral wire and two main wires, a plurality of sets of preferred translating devices, said sets being respectively individually connectable across the respective main wires and the neutral wire, an electric water heater connectable across two of the wires of the system, first and second switches connected to the respective terminals of said load, thermal responsive elements for respectively effecting the opening or closing of said switches, and electrical heaters for the respective elements connected to be energized in accordance with the currents traversing only the respective sets of said translating devices thereby to cause each thermal responsive element, upon a predetermined increase in the current traversing it from the associated set, to open the associated switch and disconnect said water heater from circuit.

PAUL R. LEE.
EARL K. CLARK.